US010860792B2

(12) United States Patent
Choi et al.

(10) Patent No.: US 10,860,792 B2
(45) Date of Patent: *Dec. 8, 2020

(54) DETECTING COMPATIBLE LAYOUTS FOR CONTENT-BASED NATIVE ADS

(71) Applicant: Nativo, Inc., El Segundo, CA (US)

(72) Inventors: Justin Yoo Choi, Newport Coast, CA (US); David Wayne Maust, Yorba Linda, CA (US)

(73) Assignee: Nativo, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,772

(22) Filed: Feb. 14, 2019

(65) Prior Publication Data

US 2019/0179886 A1    Jun. 13, 2019

Related U.S. Application Data

(63) Continuation of application No. 15/841,165, filed on Dec. 13, 2017, now Pat. No. 10,248,643, which is a continuation of application No. 14/310,933, filed on Jun. 20, 2014, now Pat. No. 9,880,994.

(60) Provisional application No. 61/837,838, filed on Jun. 21, 2013.

(51) Int. Cl.
*G06F 40/106* (2020.01)
*G06F 40/186* (2020.01)
*G06Q 30/02* (2012.01)
*G06F 40/14* (2020.01)

(52) U.S. Cl.
CPC .......... *G06F 40/186* (2020.01); *G06F 40/106* (2020.01); *G06F 40/14* (2020.01); *G06Q 30/0276* (2013.01)

(58) Field of Classification Search
CPC ... G06F 17/212; G06F 17/2247; G06F 40/106
See application file for complete search history.

(56) References Cited

U.S. PATENT DOCUMENTS

| | | | |
|---|---|---|---|
| 7,089,194 B1 | 8/2006 | Berstis | |
| 7,478,320 B2 * | 1/2009 | Nagayama | G06F 40/186 715/235 |
| 7,792,736 B2 | 9/2010 | Wasendorf, Sr. | |
| 8,073,803 B2 | 12/2011 | Murdock | |
| 8,285,734 B2 | 10/2012 | Baras | |
| 8,346,792 B1 * | 1/2013 | Baker | G06F 16/3322 707/759 |
| 8,745,075 B2 | 6/2014 | Gaucas | |
| 9,069,768 B1 * | 6/2015 | Sampson | G06K 9/00463 |
| 9,396,540 B1 * | 7/2016 | Sampson | G06K 9/00463 |
| 2002/0111966 A1 * | 8/2002 | Fukuda | G06F 40/221 715/230 |
| 2002/0165799 A1 * | 11/2002 | Jaffe | G06F 17/243 705/27.1 |
| 2005/0050044 A1 | 3/2005 | Takagi | |

(Continued)

*Primary Examiner* — Scott T Baderman
*Assistant Examiner* — Mario M Velez-Lopez
(74) *Attorney, Agent, or Firm* — Van Pelt, Yi & James LLP

(57) ABSTRACT

A plurality of pages associated with a website are crawled. Page information is generated for the plurality of pages. A plurality of locations that are compatible with a content template are determined based at least the page information for the plurality of pages. The content template is embedded in at least one of the plurality of locations.

20 Claims, 12 Drawing Sheets

(56) References Cited

U.S. PATENT DOCUMENTS

| | | | |
|---|---|---|---|
| 2005/0219665 A1* | 10/2005 | Mino | H04N 1/00167 |
| | | | 358/537 |
| 2006/0282415 A1* | 12/2006 | Shibata | G06F 16/93 |
| 2007/0208703 A1* | 9/2007 | Shi | G06F 16/951 |
| 2008/0155387 A1* | 6/2008 | Yabe | G06F 40/103 |
| | | | 715/204 |
| 2008/0263439 A1 | 10/2008 | Oz | |
| 2009/0024554 A1 | 1/2009 | Murdock | |
| 2009/0092320 A1 | 4/2009 | Berard | |
| 2009/0238464 A1 | 9/2009 | Ohira | |
| 2012/0096098 A1 | 4/2012 | Balassanian | |
| 2012/0166435 A1 | 6/2012 | Graham | |
| 2013/0132817 A1* | 5/2013 | Sharad | G06F 17/248 |
| | | | 715/234 |
| 2013/0268839 A1 | 10/2013 | Lefebvre | |
| 2014/0079297 A1* | 3/2014 | Tadayon | G06K 9/00 |
| | | | 382/118 |
| 2014/0201126 A1 | 7/2014 | Zadeh | |
| 2014/0233066 A1 | 8/2014 | Luo | |
| 2015/0154660 A1* | 6/2015 | Weald | G06Q 30/0277 |
| | | | 705/14.73 |
| 2015/0161086 A1* | 6/2015 | Wu | G06F 3/04842 |
| | | | 715/234 |
| 2015/0379341 A1 | 12/2015 | Agrawal | |
| 2016/0103800 A1* | 4/2016 | Girault | G06F 17/272 |
| | | | 715/236 |
| 2018/0232660 A1 | 8/2018 | Kagian | |

* cited by examiner

DETECTING COMPATIBLE LAYOUTS FOR CONTENT-BASED NATIVE ADS

CROSS REFERENCE TO OTHER APPLICATIONS

This application is a continuation of co-pending U.S. patent application Ser. No. 15/841,165, entitled DETECTING COMPATIBLE LAYOUTS FOR CONTENT-BASED NATIVE ADS filed Dec. 13, 2017 which is incorporated herein by reference for all purposes, which is a continuation of U.S. patent application Ser. No. 14/310,933, now U.S. Pat. No. 9,880,994, entitled DETECTING COMPATIBLE LAYOUTS FOR CONTENT-BASED NATIVE ADS, filed Jun. 20, 2014, which claims priority to U.S. Provisional Patent Application No. 61/837,838, entitled DETECTING COMPATIBLE LAYOUTS FOR CONTENT-BASED NATIVE ADS, filed Jun. 21, 2013, both of which are incorporated herein by reference for all purposes.

BACKGROUND OF THE INVENTION

Native advertising (e.g., native sponsored content) and/or in-feed ads are forms of digital advertising that resemble non-advertising content on a page (e.g., a web-page, application interface, etc.). Native advertisements may include integrated ad units which have a similar appearance to the other content in the display environment (e.g., web page, etc.). Native ad units may include content elements (e.g., including headlines, images, embedded videos, text, etc.) that resemble surrounding content elements (e.g., content elements of articles, article previews, blog postings, etc.) in the display.

A native sponsored content template may be used to deploy native advertising content on a page. A native sponsored content template may be generated by analyzing and/or mimicking elements of the design (e.g., layout, display attributes, etc.) of existing articles and/or other non-sponsored content (e.g., non-advertising content) on a page. Once generated, the sponsored content template may be used to generate from existing and/or otherwise provided advertising (or other sponsored content) a native ad for a destination content page, such as a content publisher's web page, app display page, etc.

Many websites include multiple sections (e.g., including individual pages) and sections within a website may include similar structure and content. A publisher associated with a website including multiple sections (e.g., pages) with similar structure and/or content may want to deploy native sponsored content across multiple sections of the website.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting compatible layouts for content-based native ads (e.g., native sponsored content) is disclosed. In various embodiments, first page information representing elements of a first page may be generated. Second page information representing elements of a second page may be generated. It may be determined, based at least in part on the first page information and second page information, that a native sponsored content template configured for use with the first page is compatible with the second page.

Figure 1:
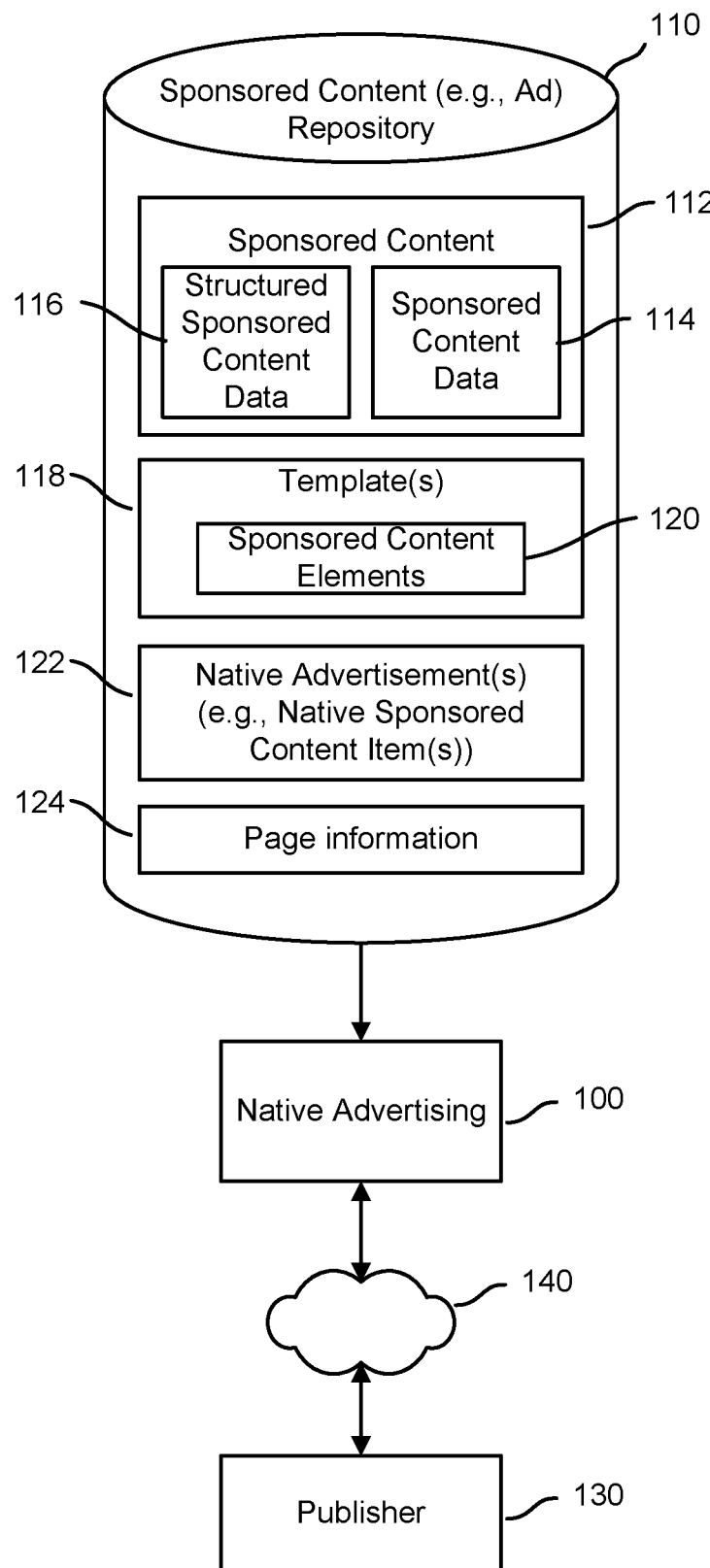
FIG. 1 is a diagram illustrating an embodiment of a system to detect compatible native advertisement layouts.

FIG. 1 is a diagram illustrating an embodiment of a system to detect compatible native advertisement layouts. In the example shown, a system to create/generate native advertising content 100 (e.g., native sponsored content) is associated with a sponsored content repository 110. The sponsored content repository 110 (e.g., advertising information repository) may include sponsored content 112 (e.g., promoted content, advertising content, sponsored content records), one or more templates 118 (e.g., native sponsored content templates), native sponsored content items 122 (e.g., native advertisements, pre-processed/assembled/generated native sponsored content items, paid postings, sponsored posts, in-feed advertisements, etc.), page information 124 (e.g., information representing the elements of one or more pages), and/or other information.

In some embodiments, the system 100 may communicate with a publisher 130 (e.g., a computing device associated with a website publisher) via a network 140 (e.g., the Internet, local area network, wide area network, and/or any appropriate communication network). In various embodiments, the system 100 may provide publisher 130 an interface (e.g., visual editor) configured to generate native sponsored content templates 118 and/or select pages (e.g., sections of website) to be associated with a template. The template may be used to deploy native sponsored content to the selected pages when loaded (e.g., when the page is visited/loaded by a user). According to some embodiments, the system 100 may generate and/or serve native sponsored content items 122 (e.g., native advertisements) to publisher 130 (e.g., for display on a website, publication, application, and/or other display context associated with publisher 130).

According to some embodiments, sponsored content 112 (e.g., advertising content) may include, for example, sponsored content data 114 (e.g., non-native sponsored content data, non-native advertising data), formatted sponsored content data 116 (e.g., structured sponsored content data), and/or other advertising/sponsored content-related data/information. Sponsored content data 114 may include text, images, videos, headlines, and/or other information for inclusion in a sponsored content item 122 (e.g., a native advertisement). Sponsored content data 114 may include, in some embodiments, sponsored content data that has not been formatted, processed, parsed, and/or structured for use in a native sponsored content item 122. In some embodiments, sponsored content data 114 may be parsed, extracted, formatted, and/or processed (e.g., at run-time) to generate a native sponsored content item 122 (e.g., a native advertisement).

In some embodiments, template(s) 118 may be used to generate a native sponsored content item 122 (e.g., a native advertisement, a paid posting, a sponsored post, etc.). A template 118 may include sponsored content elements 120 (e.g., header element, body text element, image element, video element, etc.), layouts (e.g., position(s) of the sponsored content elements), patterns, formats, attributes (e.g., text size(s), font(s), color(s), dimensions, position, appearance characteristics, and/or other attributes), and/or other information used to generate a native advertisement 122. A template 118 may, for example, define the layout, pattern, position, and/or other attributes of one or more sponsored content elements. Sponsored content elements 120 may include fields, components, and/or elements of a template 118 that define position(s), attribute(s), and/or other parameters of elements of a sponsored content item. For example, a template 118 may include attributes associated with sponsored content elements 120 in a native sponsored content article including article image attributes (e.g., whether or not to include a preview image, maximum/minimum width and height, position, maximum file size), headline attributes, article preview text attributes, author name attributes, article date attributes, article body attributes, article sharing link information, sponsored content disclaimer information, and/or any other parameters.

In some embodiments, a template 118 may be used to generate a native sponsored content item 122 (e.g., a native advertisement). Sponsored content data 114 (e.g., structured sponsored content data 116) may be retrieved, identified, selected, and/or arranged according to the template 118 (e.g., using the template 118 as a stencil to define the format, appearance, etc. of the native sponsored content item). In various embodiments, sponsored content data 114 (e.g., non-native format sponsored content) may be received and portions of the sponsored content data 114 corresponding to sponsored content elements 120 in the template 118 may be identified, extracted, and used to generate a native sponsored content item 122.

Figure 2:
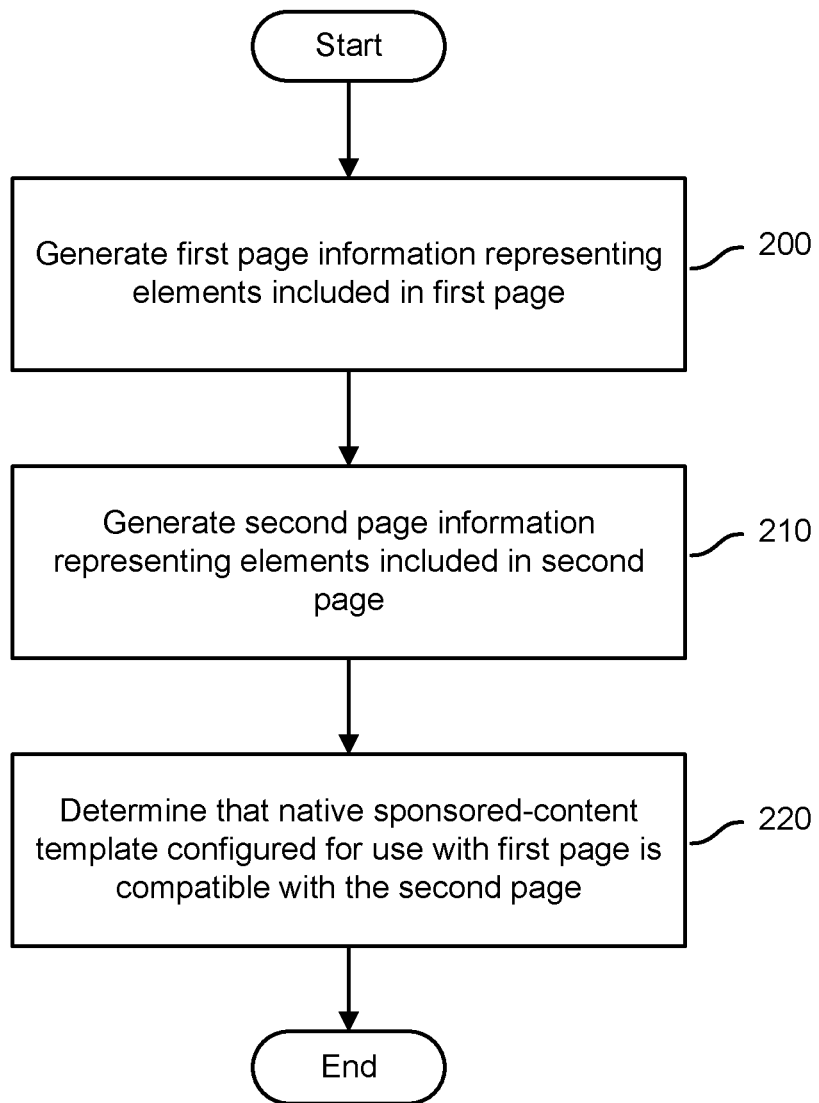
FIG. 2 is a flow chart illustrating an embodiment of a process to detect compatible native advertisement layouts.

FIG. 2 is a flow chart illustrating an embodiment of a process to detect compatible native advertisement layouts. In various embodiments, the process may be performed by system 100 depicted in FIG. 1. At 200, first page information representing elements of a first page is generated. A first page may include a page (e.g., webpage, section, etc.) included in a website. For example, the first page may include a homepage of a website (e.g., a news website, retail website, entertainment website, blog, and/or any other website), a section page of a website, and/or any other page in a website. In one example, the first page may include an article preview page including one or more article previews. In another example, the first page may include an article page (e.g., full article page), for example, linked to an article preview on an article preview page. In a further example, the first page may include a page included in an application (e.g., mobile application, a news reader applications, etc.).

In some embodiments, the first page may include a page for which a native sponsored content template has been generated. For example, a native sponsored content template may be generated for the first page based on the native hierarchical content elements (e.g., header, body, images, and/or other elements associated with an article preview and/or article) included in the first page. A native sponsored content template may be generated by mapping the native hierarchical content elements (e.g., header, body, images, and/or other elements of an article preview, full article, etc.) to sponsored content elements (e.g., header, body, images, and/or other elements of a sponsored content item). The native sponsored content template may include the sponsored content elements.

According to some embodiments, first page information may include a set of information representing elements (e.g., HTML elements) included in a first page. The first page information may, for example, represent the structure of the HTML elements included in the first page, the content included in the first page, and/or other attributes of the first page. In some embodiments, the first page information may include source code associated with the first page, a document object model (DOM) associated with the first page, and/or any other representation of elements in the first page. In some embodiments, the first page information may include a vector (e.g., a structure vector) and/or other data representing the structure of elements included in the first page.

In various embodiments, the first page information may represent the content (e.g., content categories, topics, subject matter, etc.) of the first page. For example, the first page information may include a vector (e.g., a content vector) representing the content associated with text included in the first page. The first page information may include content categories determined to be associated with text in the first page.

According to some embodiments, first page information may include a representation of the structure and/or content of a portion of the page associated with a native sponsored content template. For example, the first page information may represent only a portion of the first page in which a native sponsored content template has been configured to display a sponsored content item (e.g., when the page is loaded).

In some embodiments, first page information may include image data representing the elements of the first page. For example, the first page information may include a screenshot and/or other image of the first page as displayed in a browser (e.g., a desktop browser, mobile browser, etc.), application, and/or other interface.

At 210, second page information representing elements included in the second page is generated. In various embodiments, a second page may include a different page of a website that includes the first page. For example, the first page and second page may each include a separate section of a website. The first page may include, for example, the U.S. news section of a news website (e.g., news.com), and the second page may include the international news section of the news website.

In various embodiments, the second page information may represent the structure, content, and/or other attributes of the second page. The second page information may include any of the types of information included in the first page information as discussed herein. According to some embodiments, second page information representing elements included in the second page may be generated using any of the approaches discussed herein. For example, the second page information may be generated for the second page in a similar manner to the first page information generated for the first page.

At 220, it may be determined that a native sponsored content template configured for use with the first page is compatible with the second page. In various embodiments, the first and second page information may be used to determine that the native sponsored content template is compatible with the second page. In some embodiments, first page information representing elements of the first page may be analyzed to identify a structural layout of at least a portion of the page. For example, a location on the page where the native sponsored content template is configured to place a native advertisement may be analyzed. A DOM tree and/or other representation of the first page as included in the first page information may be navigated. And a selector (e.g., Cascading Style Sheets (CSS) selector) may be generated based on the portions of the page (e.g., the portions of the page where the native sponsored content is to be placed). This selector may then be compared to page information associated with multiple pages (e.g., other pages of the website). In some embodiments, it may be determined that the second page matches the selector. Based on the determined selector match, it may be determined that the second page is compatible with the native sponsored content template configured for use with the first page.

In various embodiments, first page information representing elements included in a first page may be compared to second page information representing elements included in the second page. Based on the comparison, it may be determined that the pages are substantially similar. For example, the first and second pages may be determined to be substantially similar because they include similar page struc-tures (e.g., similar layouts of elements in the page). In another example, the first and second pages may be determined to be substantially similar because the page structure in a portion of the first page where sponsored content is to be placed is similar to a corresponding portion of the second page. In various embodiments, a value (e.g., metric) defining a level of similarity between the structure of the first page (e.g., a portion of the first page) and the structure of the second page (e.g., a portion of the first page) may be generated. In one example, a cosine similarity value representing a level of similarity between the structure of the first and second pages may be generated. The cosine similarity may be generated based on a first vector (e.g., a structure vector) representing the structure of elements of the first page and a second vector representing the structure of elements of the second page. In the event the cosine similarity value is above a threshold, it may be determined that the first and second pages are substantially similar (e.g., in terms of structure).

In various embodiments, the first and second pages may be determined to be substantially similar because they include similar content (e.g., matching content categories, a number of identical content categories that exceeds a threshold, etc.). For example, the first page information may include content categories (e.g., topics, subject matter) determined to be associated with the first page. And the second page information may include content categories determined to be associated with the second page. The first page information and second page information may be compared to determine a number (if any) of overlapping content categories (e.g., topics, subject matter) between the first page and second page. In some embodiments, if number of content categories included in both the first and second page is above a threshold (e.g., a fixed threshold, an automatically determined threshold (e.g., determined in a clustering operation), etc.), it may be determined that the first page and second page are substantially similar.

In some embodiments, based on a determination that the first and second pages are substantially similar, it may be determined that a native sponsored content template configured for use with the first page is compatible with the second page. In various embodiments, based on a determination that the native sponsored content template is compatible with the second page, the second page may be assigned to a placement group associated with the template. A placement group may include a group of pages to which the native sponsored content template is assigned.

In various embodiments, the second page may be added to a group of pages known to be compatible with the native sponsored content template, and a user may be able to select one or more of the compatible pages for inclusion in a placement group.

Figure 3:
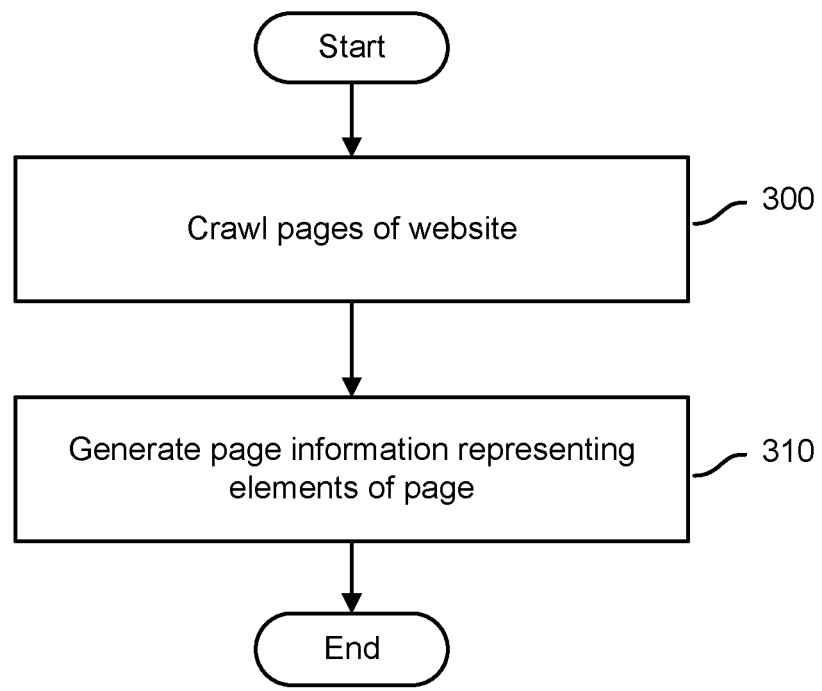
FIG. 3 is a flow chart illustrating an embodiment of a process to generate page information.

FIG. 3 is a flow chart illustrating an embodiment of a process to generate page information. At 300, pages of a website may be crawled. A website may include one or more sections each including page(s) (e.g., section pages). In various embodiments, a crawling operation may be performed to index the pages and/or sections of a website. The crawling operation may also be performed to generate data representing the relationships (e.g., links) between various pages and/or sections of a website. In various embodiments, the pages may be crawled in the context of different devices and/or browsers. For example, the website may be crawled in the context of a mobile browser, desktop browser, application, and/or any other interface. Any crawling approaches known in the art may be used to index the sections of a website.

At 310, page information representing the elements of a page may be generated for one or more pages of a website. In various embodiments, the crawling operation may be used to generate page information representing the structure (e.g., elements comprising the layout) of page(s) in a website. As discussed above, the page information may represent the elements (e.g., HTML elements) of a page as well as relationships between the elements defining the structure of the page. As discussed above, the crawling operation may be performed in the context of different devices and/or browsers and the page information may represent the structure of the website as displayed in a desktop browser, mobile browser, application, and/or other types of displays. For example, the page information may include separate representations of the page for each of multiple browser types.

In some embodiments, page information representing content of one or more pages may be generated using a crawling operation. A crawler module may, for example, index and store information representing the elements of a page for each of multiple pages included in a website. In some embodiments, a website may include a large number of pages and it may be computationally cumbersome to crawl all the pages of the website. In this case, the crawler may retrieve page information representing the content of a group of sample pages. Based on the content of the page information for the sample pages, it may be determined if additional pages should be crawled. For example, if the sample pages (e.g., a statistically significant sample set) all include similar content, it may be determined that page information for additional pages need not be retrieved (e.g., because the additional pages likely include similar content).

In some embodiments, not all pages may be unique to a given section. For example, an article page is typically auto-generated dynamically for multiple articles (e.g., every single article) on a website. The layouts of these article pages may be substantially the same. A typical crawler may, however, index the pages as individual separate pages. In various embodiments, the uniform resource locator (URL) structure may be analyzed (e.g., by the crawler and/or other module) to ignore pages that are likely generated from one page and should be treated as one section and/or group of pages. For example, a website may include thousands of article displays (e.g., for each article on the website), but each individual article page may not include a potential placement. Rather, all article pages (e.g., substantially similar article pages) combined as a whole may comprise a single placement. The system identifies this in various embodiments by analyzing the URL or other page information and understanding that the pages are variations of one page rather than individual sections of the site. In some embodiments, users may also have the ability to instruct the system to ignore certain URL patterns.

Figure 4:
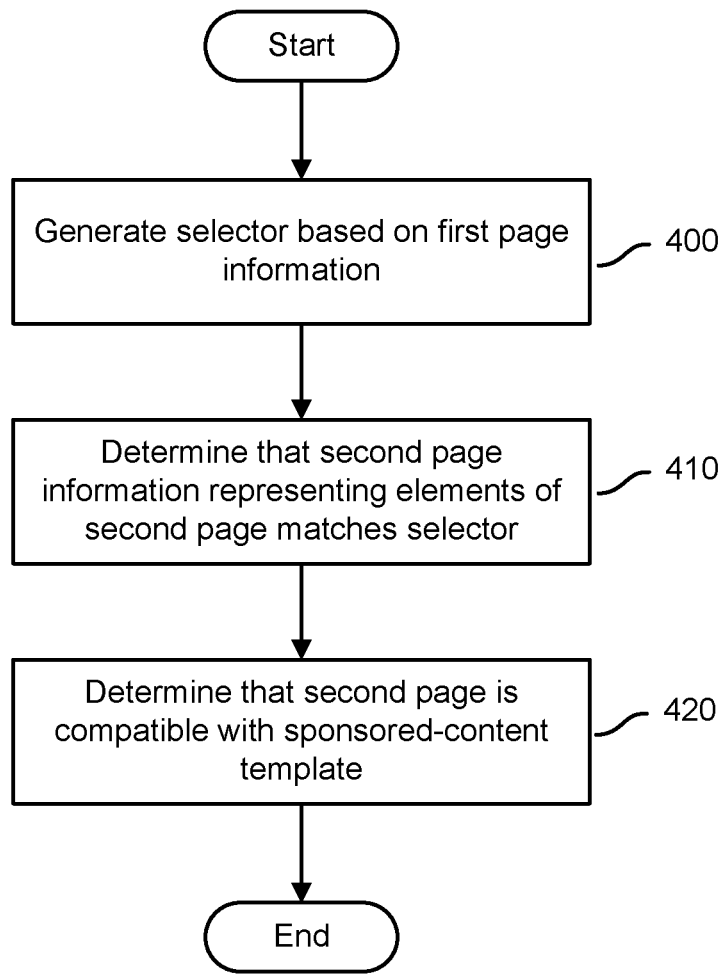
FIG. 4 is a flow chart illustrating an embodiment of a process to determine that a sponsored content template is compatible with a page.

FIG. 4 is a flow chart illustrating an embodiment of a process to determine that a sponsored content template is compatible with a page. At 400, a selector may be generated based on first page information. In various embodiments, a selector may be generated based on a first page information representing elements of a first page. As discussed above, a first page may include a page for which a native sponsored content template has been generated. In some embodiments, the template may be used to generate native sponsored content (e.g., native advertisements). For example, a template may, in certain cases, define a placement of one or more sponsored content elements at a location in a page (e.g., a native display).

In various embodiments, a location on the first page where the native sponsored contemplate is configured to place a native advertisement is determined. The location may be determined by analyzing (e.g., processing) the first page information representing elements of the first page and/or the native sponsored content template.

In various embodiments, a selector (e.g., CSS selector) may be generated based on the first page information. For example, a document object model (DOM) tree associated with the first page may be navigated and a selector may be generated. A selector may, for example, be generated based on a portion of DOM tree corresponding to location(s) on the first page where the native advertisement is to be placed (e.g., as defined by the native sponsored content template). The selector may be generated such that the elements (e.g., HTML elements) included in the location on the first page where the native sponsored content is to be placed will be selected. The selector may be used to find (e.g., identify) elements in a page that are similar (e.g., substantially similar) in structure and/or layout to elements of the first page. For example, the selector may be configured to identify elements of a page that are similar in structure to the elements of the first page where the native sponsored content is to be placed. In various embodiments, a selector may include a group of selectors (e.g., a group of CSS selectors). For example, element selectors, id selectors, class selectors, and/or any other types of selectors may be grouped to generate a selector. In some embodiments, multiple separate selectors may be used to identify elements in a page that are similar (e.g., substantially similar) in structure and/or layout to elements of the first page.

At 410, it may be determined that second page information representing elements of the second page matches the selector. In various embodiments, the selector (e.g., CSS selector) may be applied to (e.g., compared against) one or more sets of information each representing elements of a page (e.g., section) of a website (e.g., a website including the first page, a separate website, etc.). Based on the application of the selector to the information representing the pages, it may be determined that a second page matches the selector. For example, it may be determined that a portion of the second page matches the selector. A determination that the second page (e.g., at least a portion of the second page) matches the selector may indicate that the second page is substantially similar to the first page (e.g., the portion of the first page where the native advertisement is displayed).

At 420, it may be determined that the second page is compatible with the sponsored content template. In various embodiments, it may be determined that the second page is compatible with sponsored content template based on the determination that the selector matches the second page. The fact that the second page matches a selector may indicate that the structure of the second page (e.g., a portion of the second page) is sufficiently similar to the structure of the portion of the first page where the native sponsored content template is configured to place an advertisement. For example, based on the similarity in structure and/or layout, it may be determined that the native sponsored content template could be used with second page without modification (e.g., substantial modification) to the template.

In various embodiments, using the techniques discussed above, information associated with multiple pages (e.g., section of a website) may be processed to determine compatibility with the native sponsored content template. And multiple pages may be determined to be compatible with the native sponsored content template. In various embodiments, pages determined to be compatible with the native sponsored content template may be added to a group and/or set of pages determined to be compatible with the template.

Figure 5:
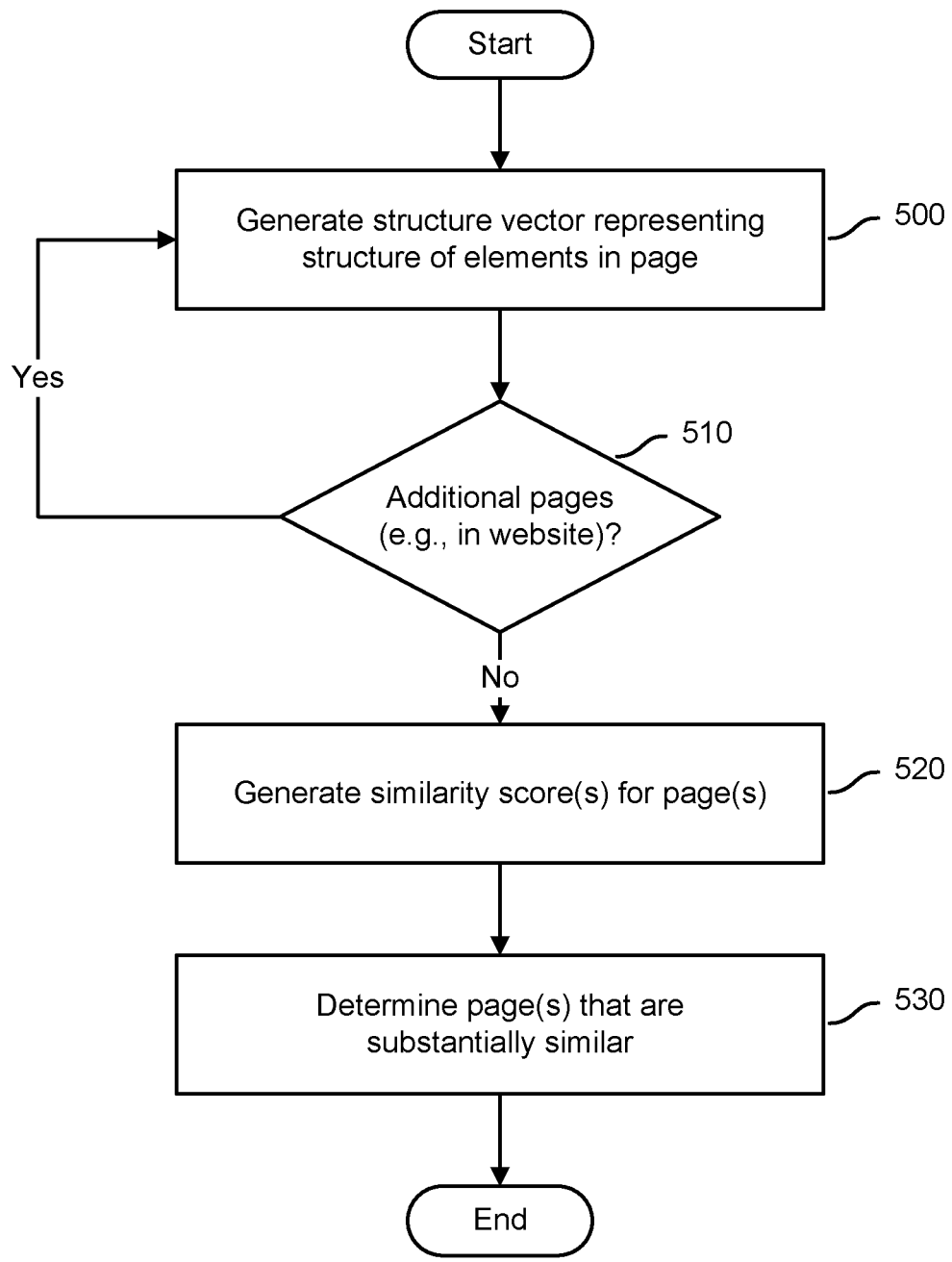
FIG. 5 is a flow chart illustrating an embodiment of a process to determine similar pages.

FIG. 5 is a flow chart illustrating an embodiment of a process to determine similar pages. At 500, a structure vector (e.g., a feature vector) representing a structure of elements in a page may be generated. The structure vector may be included in page information representing elements of a page. The vector may, for example, represent the structural layout of elements (e.g., header, body, paragraph, image, video, and/or other elements) on the page. The layout of elements on a page may be defined, for example, by the types of elements on the page, the location of the elements on the page, and/or other information representing the layout of the page. In some embodiments, the page information may represent the structural elements of the page irrespective of the text content of the page (e.g., the text displayed to a user). In various embodiments, a vector representing the structure of elements in the first page may be generated by applying a term frequency-inverse document frequency (tf-idf) approach to extract elements of the first page (e.g., HTML elements of the first page). A tf-idf value may include a numerical statistic representing an importance of a term to a document in a corpus of documents. In this case, the tf-idf approach may be used to determine a weight (e.g., importance) of each of one or more elements (e.g., HTML elements) in the page and/or across multiple pages.

According to some embodiments, in a tf-idf approach, a product of a term frequency (e.g., element frequency) and an inverse document frequency (e.g., inverse page frequency) may be generated for each of one or more elements in the first page. In various embodiments, a tf-idf value may be generated as a product of a term frequency and an inverse document frequency using the following equation:

$$tfidf(t,d,D) = tf(t,d) \times idf(t,D)$$

In various embodiments, the term frequency, tf(t, d), may include, for example, a raw frequency of a element, t, (e.g., term) in the page, d, (e.g., document), a Boolean frequency of the term (e.g., 1 if the element occurs in the page and 0 otherwise), a logarithmically-scaled frequency, an augmented frequency, and/or other type of frequency. An inverse page frequency, idf(t, D), (e.g., inverse document frequency) may indicate how common and/or rare an element is across all pages (e.g., all pages of website, all sections of the website, and/or any other set of pages). In some embodiments, the inverse page frequency, idf(t, D), may be generated using the following equation:

$$idf(t, D) = \log \frac{N}{|\{d \in D : t \in d\}|}$$

In some embodiments, the inverse page frequency, idf(t, D), may include a logarithm (e.g., base-10, base-e, etc.) of a total number of pages, N, (e.g., documents) in corpus divided by a number of pages, d, in a corpus of pages, D, where the term, t, (e.g., element) appears.

According to various embodiments, a tf-idf approach may be applied to elements of a page to generate a weight for each of one or more elements included in the first page. In certain cases, an element (e.g., an HTML element) in the first page may be transformed (e.g., converted) to a "term" for use in a tf-idf algorithm. In certain cases, an element may be transformed to a term by concatenating a tag name and select attributes associated with the element. For example, id, class, and/or other attributes may be concatenated with a tag name for each of one or more elements. And the concatenated tag names, attributes, and/or other components of an element may comprise a term for use with the tf-idf algorithm. Using the tf-idf approach, a weight may be generated for each of one or more elements in the first page and the weights and/or elements may be stored in feature vector representing elements of (e.g., the structure of) the first page.

In some embodiments, a feature vector may be generated using Javascript and/or other code included on the page that is configured to extract structural elements (e.g., features) from the pages when a user visits the site.

At 510, it may be determined whether structure vector(s) are to be generated for other pages. In some embodiments, feature vectors representing a structure of elements in a page may be generated for each of one or more pages of a website (e.g., all pages of a website, a subset of pages of a website, etc.). In the event it is determined that feature vectors are to be generated for additional page(s) of the website, the process may proceed to step 500. In the event it is determined that no additional pages are to be indexed, the process may proceed to step 520.

At 520, similarity scores may be generated for pages (e.g. of a website). In various embodiments, a value representing a level of similarity (e.g., a similarity score) between a first structure vector representing a structure of elements of a first page (e.g., a page associated with a native sponsored content template) and a second structure vector representing a structure of elements of a second page may be generated. In various embodiments, a cosine similarity value representing a level of similarity between the structure of the first and second pages may be generated. The cosine similarity may be generated using, for example, the following equation:

$$sim(A, B) = \cos(\theta) = \frac{A \cdot B}{\|A\|\|B\|}$$

In various embodiments, a cosine similarity, sim(A, B), may be generated based on a first vector, A, and a second vector, B. The cosine similarity value may include, for example, a normalized dot product of a first vector, A, representing a structure of elements in a first page (e.g., a tf-idf vector for a first page as discussed above) and a second vector, B, representing a structure of elements in a second page (e.g., a tf-idf vector for a second page). The normalized dot product may include, for example, a dot product of the first vector, A, and second vector, B, divided by the norms of the first vector, A, and second vector, B.

In various embodiments, similarity values, score, and/or indicators may be generated for pairs of pages including a first page (e.g., a page for which a native sponsored content template has been generated) and one or more other pages (e.g., other pages of a website). In certain cases, cosine similarity scores may be generated between a first page and each of multiple pages in a website (e.g., a website including the first page).

In some embodiments, similarity values (e.g., cosine similarity scores) may be generated for multiple pairs (e.g., a set of pairs, all pairs, etc.) of pages in a website. For example, a set of pages may be determined (e.g., selected), and similarity scores may be generated for each pair of pages in the set.

At 530, substantially similar pages may be determined. In various embodiments, it may be determined that two pages (e.g., a first page and a second page) are substantially similar if a similarity value (e.g., a cosine similarity score) associated with the pages is above a threshold (e.g., a fixed threshold, automatically determined threshold, etc.). For example, a threshold similarity score may be defined by user input, may be automatically determined (e.g., using a clustering approach), and/or otherwise defined. In the event a cosine similarity score generated based on a first feature vector representing the structure of elements on the first page and a second feature vector representing the structure of elements on the second page is above a threshold, it may indicate that the first page and second page are substantially similar (e.g., in terms of structure, page layout, etc.).

In various embodiments, a clustering approach may be used to determine that pages are substantially similar. As discussed above, similarity values (e.g., cosine similarity values) may be generated for a first page and multiple other pages (e.g., of a website). The similarity values may be divided into clusters, groups, and/or sets. The similarity values may be divided into clusters using, for example, a K-means, difference in means, hierarchical agglomerative clustering, Density-Based Spatial Clustering of Applications with Noise (DBSCAN), and/or other approach. In one example, automatically determined thresholds may be generated using a clustering approach, and the automatically determined threshold(s) may be used to group similarity scores into clusters. For example, a Density-Based Spatial Clustering of Applications with Noise (DBSCAN) approach may be used to generate groups and/or clusters of similarity values. And pairs of pages (e.g., a first page and an other page) associated with similarity values in a cluster and/or group may be determined to be similar pages (e.g., substantially similar pages).

According to some embodiments, pages may be clustered and/or grouped based on feature vectors representing a structure of elements of each page. For example, pages may be clustered and/or grouped based on the data included in the feature vectors (e.g., as opposed to similarity values between feature vectors). In one example, a DBSCAN approach may be used to cluster feature vectors each associated with a page (e.g., a page/section of a website). Pages associated with feature vectors included in a cluster and/or grouping may be determined to be similar pages (e.g., in terms of structure).

In some embodiments, pages (e.g., of a website) may be automatically grouped using, for example, similarity scores and/or clustering approaches without any user interaction. In certain cases, native sponsored content templates may be automatically generated and assigned to the group of pages. For example, by analyzing the element structure (e.g., HTML structure) that all pages in a group share, potential locations where a native sponsored content element could appear may be generated. In certain cases, sites often reuse the header, menu, and footer sections to preserve branding, but the regions that display variation are typically where content is found. Repetitive elements (e.g., HTML fragments) in some embodiments may be isolated from the group of pages, which the system then uses to model the design of a potential native ad unit. A rendering of pages displaying pre-configured ad units may be provided (e.g., as discussed below), and the user to may able to select which, if any, they'd like to enable for that group of pages. Using this approach, pages are automatically grouped, native ad unit locations are predicted, and/or the design of a native sponsored content unit is pre-configured (e.g., as a result expediting the setup process).

Figure 6:
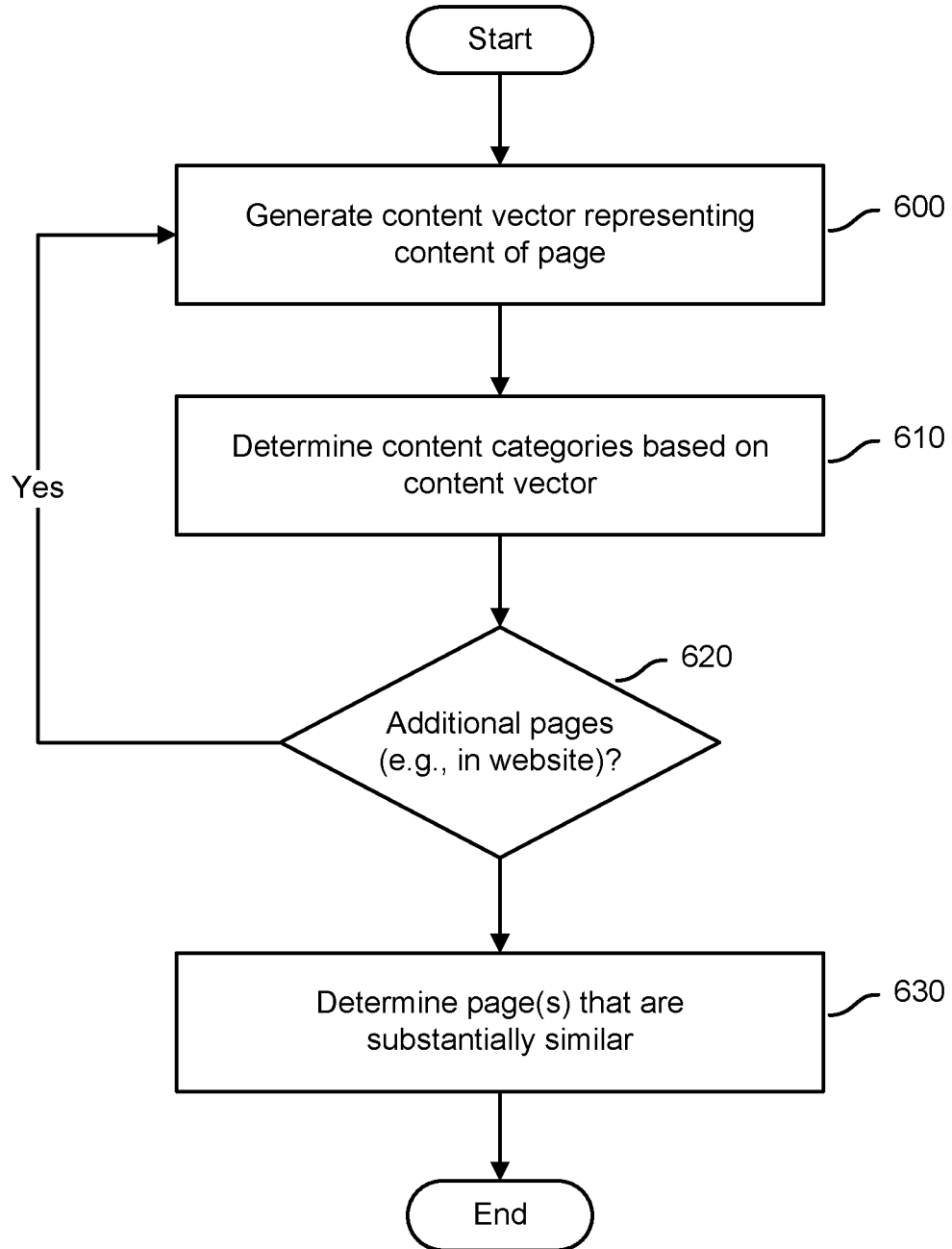
FIG. 6 is a flow chart illustrating an embodiment of a process to determine similar pages.

FIG. 6 is a flow chart illustrating an embodiment of a process to determine similar pages. At 600, a content vector (e.g., a feature vector) representing content associated with text included in the page may be generated. The content vector may be included in page information representing elements of a page. As discussed below, the page information may represent content categories (e.g., topics, subject matter, etc.) associated with text (e.g., visible text) on the page.

In various embodiments, a content vector representation of the terms included in a page may be generated by extracting text from the page using a tf-idf approach. The text may be included, for example, in header, body, paragraph, image, video, and/or other elements of the page (e.g., as represented in source code and/or document object model (DOM) of the page). For example, to generate a content vector, text included in the page may be normalized. In a normalization operation, text may be filtered to include (e.g., only include) visible text (e.g., text displayed when the page is loaded in a browser). In some cases, HTML markup, invisible components of the page (e.g., components not visible when the page is loaded in a browser), stop words (e.g., the, is, at, which, on, etc.), punctuation (e.g., commas, periods, question marks, etc.), and/or other text may be filtered (e.g., removed). In certain instances, a stemming approach may be applied to reduce inflected (e.g., derived) text to stem, base, and/or root form. In various embodiments, the normalized, filtered, stemmed, and/or otherwise processed text may be extracted using a tf-idf approach to generate a content vector representation of the text (e.g., terms) included in the page.

At 610, content categories may be determined based on the content vector. In various embodiments, content may be classified into categories (e.g., predefined targeting categories, content categories, topics, etc.) using, for example, one or more classifiers (e.g., classification models). Content categories (e.g., topics) may include, for example, news, domestic news, international news, sports, recreation, consumer goods, space flight, and/or any other topic.

In some embodiments, a classifier may be trained using a training set of manually classified text (e.g., set of text not associated with the page). A vector generation process (e.g., as discussed above) may be performed to train the classifier. For example, a training content vector may be generated from the training set of manually classified text. A training content vector may be generated using, for example, a tf-idf approach based on the set of training data. The training content vector (e.g., generated based on the training set) may be used to generate one or more classifiers. For example, classifiers (e.g., classification models) may be generated for each of one or more categories (e.g., content categories, topics, etc.) using, for example, a multiclass classification approach (e.g., one-vs-all classification). The classifiers (e.g., classification models) may include, for example, Naïve Bayes classifiers, support vector machines, decision tree classifiers, rule-based classifiers, neural networks, and/or other types of classifiers.

In various embodiments, as discussed above text included in a page may be used to generate a content vector (e.g., representing the content of a page). In certain cases, the text may be vectorized using a dictionary and/or inverse document frequency (IDF) weights from the training set. In some embodiments, the text from a page as represented in the content vector may be classified using one or more of the classification models. In one example, after vectorization, text from the page can be classified by identifying which of one or more Naïve Bayes models predicts a highest probability of the text being classified. For example, each of one or more Naïve Bayes models may be, for example, associated with a content category. And text in the page that is included in the content vector may be determined to match content categor(ies) associated with the Naïve Bayes model(s) that predict a highest probability of classification.

In another example, a support vector machine may be used to classify content included in the page. In some embodiments, the page information may be updated to include content categories determined to be associated with text in the page.

At 620, it may be determined whether content vector(s) are to be generated for other pages. In some embodiments, content vectors representing content in a page may be generated for each of one or more pages of a website (e.g., all pages of a website, a subset of pages of a website, etc.). In the event it is determined that content vectors are to be generated for additional page(s) of the website, the process may proceed to step 600. In the event it is determined that no additional pages are to be indexed, the process may proceed to step 630.

At 630, it may be determined that page(s) are substantially similar. In various embodiments, pages may be determined to be substantially similar because they include similar content (e.g., matching content categories, a number of identical content categories that exceeds a threshold, etc.). For example, a first content vector may include content categories (e.g., topics, subject matter) determined to be associated with a first page. And a second content vector may include content categories determined to be associated with a second page. The first page information and second page information may be compared to determine a number (if any) of overlapping content categories (e.g., topics, subject matter) between the first page and second page. In some embodiments, if number of content categories included in both the first and second page is above a threshold (e.g., a fixed threshold, an automatically determined threshold (e.g., determined in a clustering operation), etc.), it may be determined that the first page and second page are substantially similar.

In various embodiments, groups and/or clusters of pages may be generated based on content vectors associated with each page. For example, any of the clustering approaches discussed herein or known in the art may be applied to content vectors to generate groups and/or clusters of content vectors. As discussed above, native sponsored content templates may be automatically generated for groups of pages.

In various embodiments, the processes of FIG. 5 and/or FIG. 6 may be performed before and/or after the process of FIG. 4 to filter or reduce the number of pages processed using the selector-based approaches discussed with reference to FIG. 4.

Figure 7:
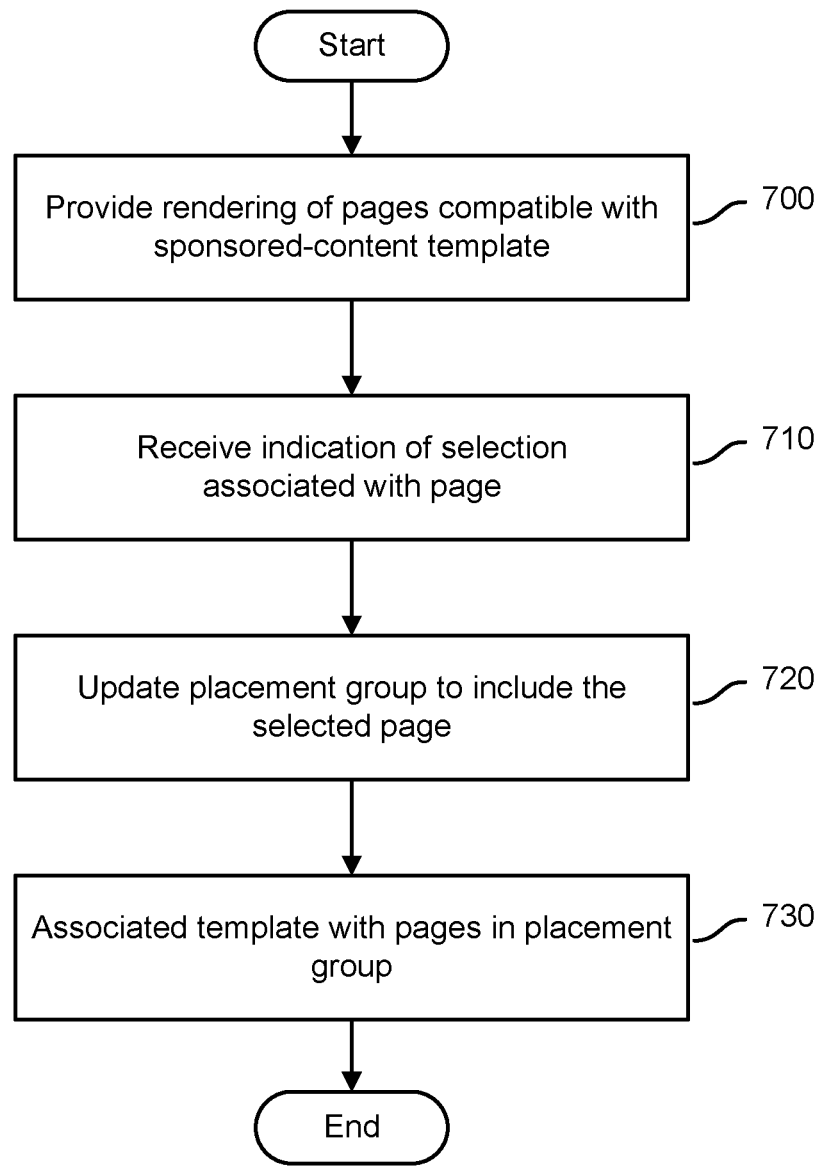
FIG. 7 is a flow chart illustrating an embodiment of a process of generating a sponsored content placement group.

FIG. 7 is a flow chart illustrating an embodiment of a process of generating a sponsored content placement group. At 700, a rendering of pages determined to be compatible with a sponsored content template may be provided. In various embodiments, an interface (e.g., in a browser interface) may be provided that includes selectable renderings of a group of pages (e.g., sections) determined to be compatible with a native sponsored content template. The renderings may include representations (e.g., screen shots, dynamic displays, etc.) of pages and/or sections of a website that have been determined to be compatible with a native sponsored content template. In various embodiments, the renderings may include pages that have been determined to be substantially similar to a first page (e.g., a page for which a native sponsored content template has been generated).

At 710, an indication of selection associated with a page may be received. In various embodiments, a rendering of a page (e.g., section of website) may be selected (e.g., by a user) within a display of the renderings. For example, a user may select a rendering of a placement by clicking on the rendering, highlighting the rendering, entering data related to the rendering, and/or otherwise selecting the rendering.

At 720, a placement group may be updated to include the selected page. In various embodiments, a placement group may include pages and/or sections in which a native advertisement will be placed (e.g., assigned to). In various embodiments, a placement group may include a subset of pages (e.g., sections) included in a website. For example, the subset of pages may include only pages selected by a user (e.g., and at least one other page (e.g., section)) of the website may not be included in the placement group. In some embodiments, the placement group may include pages each associated with one or more common content categories (e.g., topics). For example, the pages included in the display may include pages determined to include substantially similar content (e.g., topics).

At 730, the native sponsored content template may be associated with the pages in the placement group. In various embodiments, a native sponsored content template may be assigned to one or more of the pages (e.g., sections) in the placement group. For example, the native sponsored content template may be assigned to all pages in the placement group. A native sponsored content template assigned to a page may, for example, configure the page (e.g., alter the source code of the page) to display a native sponsored content item (e.g., native advertisement) when the page is loaded (e.g., by a visitor to the page). Using this technique, a single native sponsored content template may be assigned to a large number of pages/sections of a website.

Figure 8:
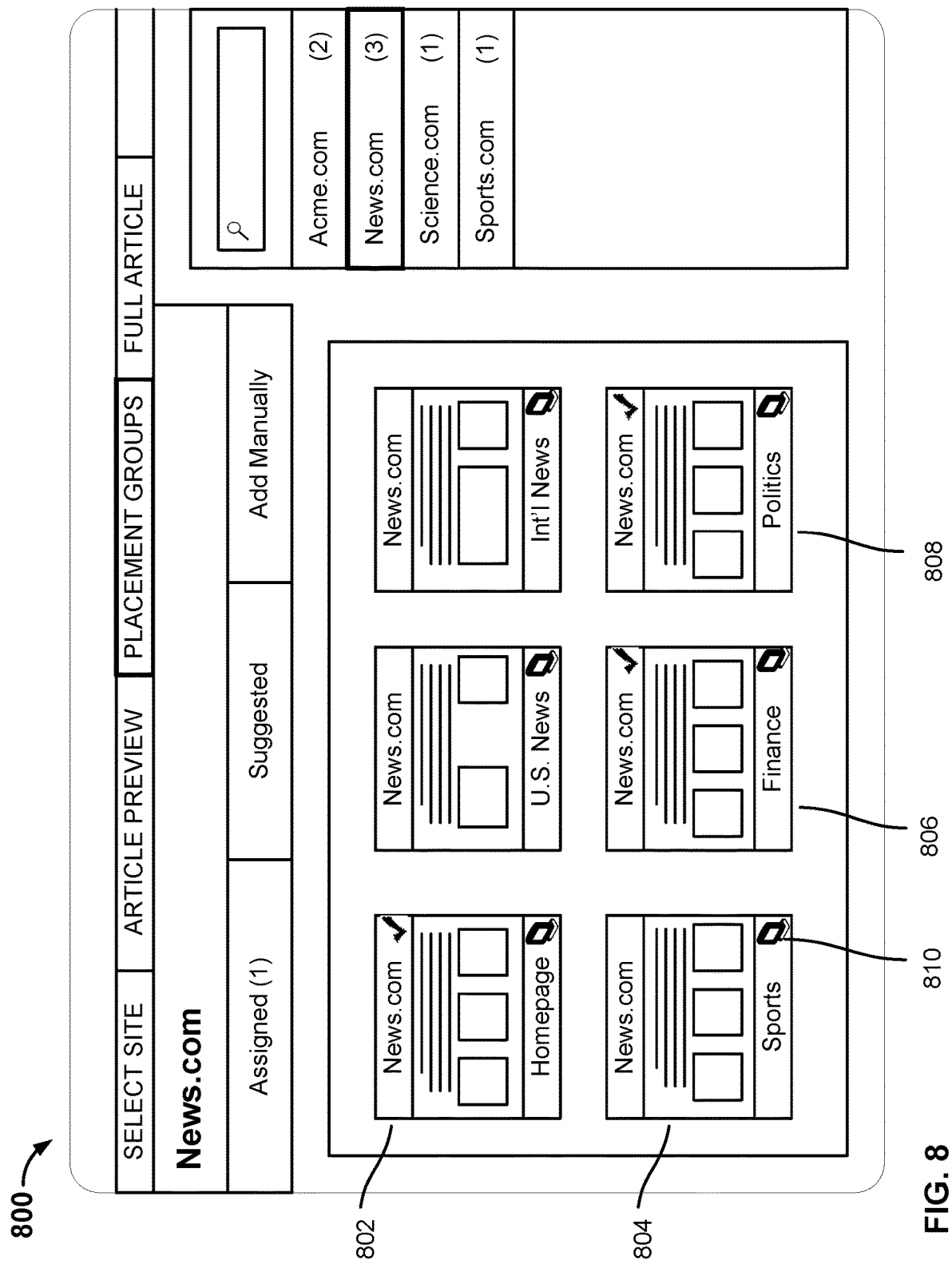
FIG. 8 is a diagram illustrating an embodiment of a display to select pages for a placement group.

FIG. 8 is a diagram illustrating an embodiment of a display to select pages for a placement group. In the example shown, an interface 800 may be provided (e.g., in a web browser, application, etc.) to generate a placement group (e.g., including multiple sections of a website). The interface 800 may, for example, be provided to a publisher (e.g., associated with a website), an advertising provider, and/or other user. In various embodiments, the interface 800 may include a rendering(s) of page(s) 802, 804, 806, 808 (e.g., sections of a website) determined to be compatible with the native sponsored content template. In some embodiments, the interface 800 may include rendering(s) of pages 802, 804, 806, 808 that have been determined to be substantially similar (e.g., based on structure, content, and/or other attributes as discussed herein). The interface 800 shown includes renderings of sections of a news website (e.g., news.com). The renderings may display pages as they would be viewed in different types of browsers (e.g., mobile browsers, desktop browsers, an application interface, etc.), and an indicator 810 may be shown to inform a user which version of the page is displayed. By way of example, a rendering of the home page 802 of the website may include a display depicting the appearance of the home page as viewed in a desktop browser.

In various embodiments, a user may select pages (e.g., sections) included in the interface 800. In the example shown, a user may have selected the homepage 802, the finance section 806, politics section 808, and/or other sections. The selected sections may be denoted by a checkmark, highlighted border, and/or any other indicator(s). The selected sections may, for example, be added to a placement group associated with a native sponsored content template. And the native sponsored content template may be assigned to the selected pages. Once assigned, the native sponsored content template may configure the pages to display sponsored content items (e.g., a native advertisements) when loaded (e.g., by a visitor to the page).

Figure 9:
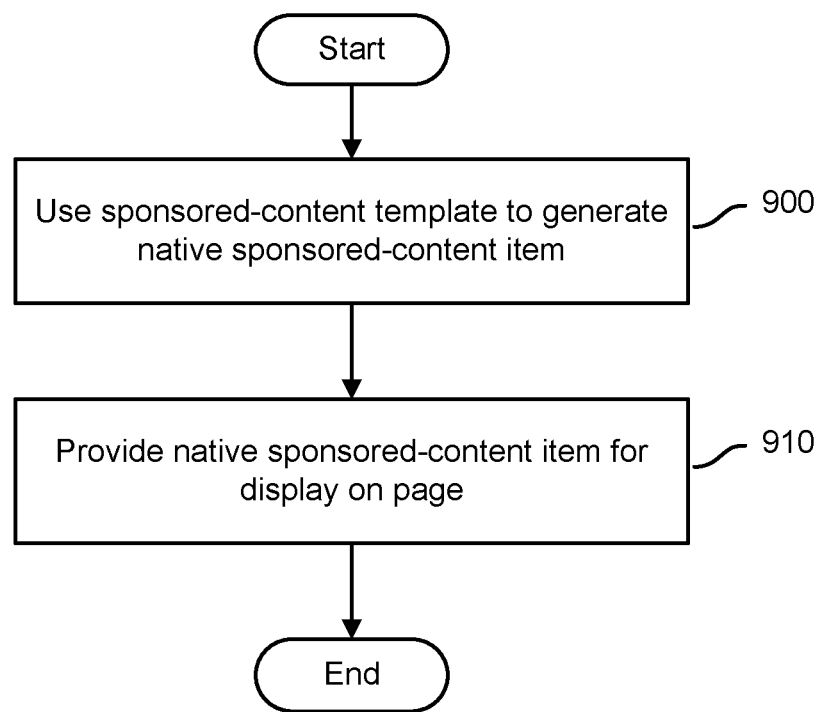
FIG. 9 is a flow chart illustrating an embodiment of a process to provide a native sponsored content item.

FIG. 9 is a flow chart illustrating an embodiment of a process to provide a native sponsored content item. At 900, a sponsored content template may be used to generate a native sponsored content item (e.g., a native advertisement). In some embodiments, a native sponsored content template may be embedded in the code for a page and may include code to retrieve native sponsored content data for display in the page. In various embodiments, a call may be made at run-time (e.g., when a native display page is loaded in a browser, application, etc.) to a native sponsored content generation system (e.g., system 100 of FIG. 1) requesting generation of a native sponsored content item. In certain cases, the native sponsored content data may be formatted using the template so that the content is properly displayed on the page.

At 910, a native sponsored content item may be provided. In some embodiments, the native sponsored content item may be provided for display in the page. The native sponsored content item (e.g., native advertisement, paid posting, in-feed advertisement, etc.) may appear adjacent to other non-advertising content on the page. In various embodiments, the process depicted in FIG. 9 may be executed each time a page associated with the native sponsored content template is loaded.

Figure 10:
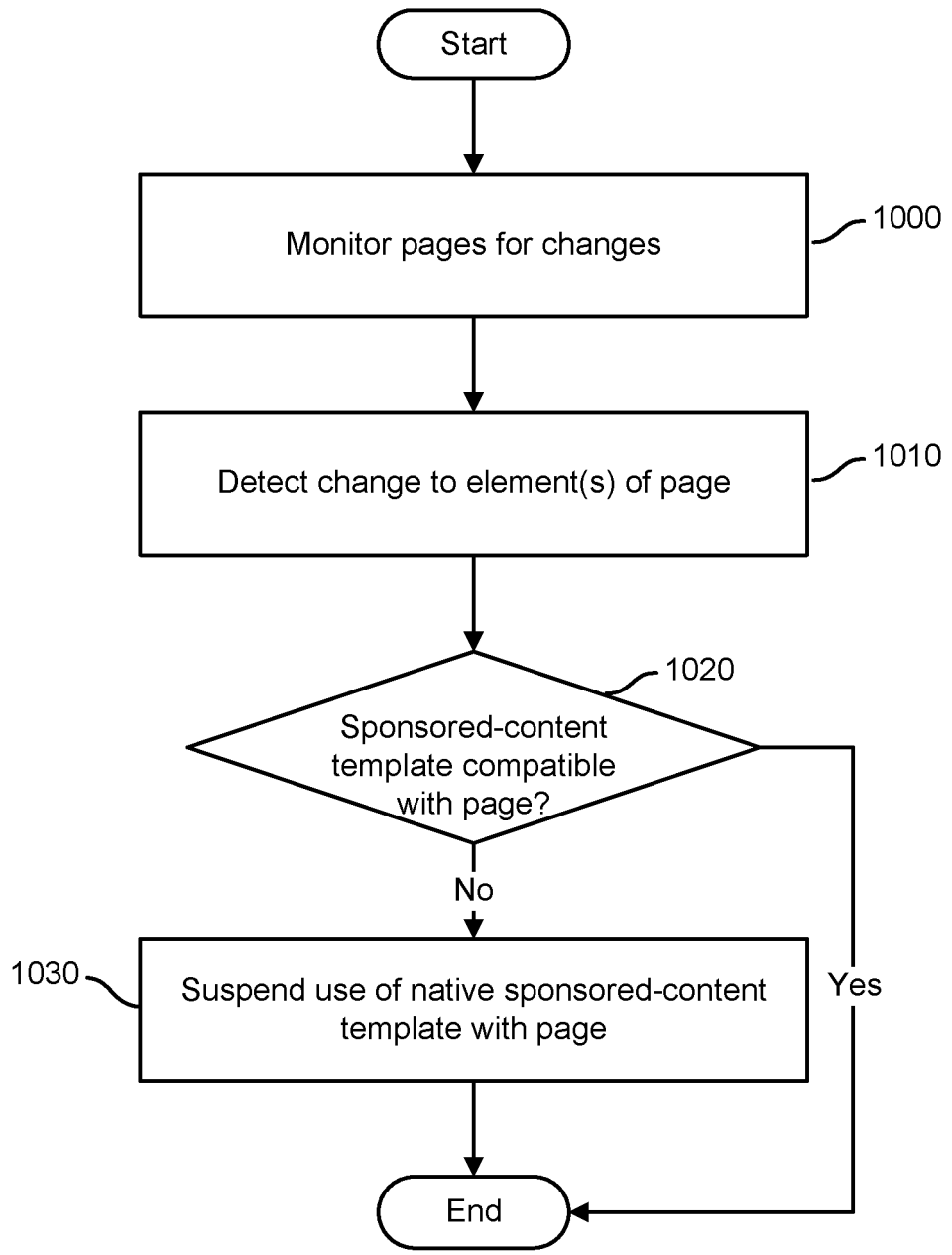
FIG. 10 is a flow chart illustrating an embodiment of a process to detect changes to pages associated with a native sponsored content template.

FIG. 10 is a flow chart illustrating an embodiment of a process to detect changes to pages associated with a native sponsored content template. At 1000, pages may be monitored for changes. In various embodiments, pages included in a placement group may be monitored to detect changes to the structure, content, and/or other attributes of a page. The pages may be monitored continuously, at intervals, upon the occurrence of events, and/or at any other time. For example, a crawler and/or other component may continuously monitor pages in a placement group to detect changes. In some embodiments, only portions of a page where the native sponsored content template is configured to display a native sponsored content item may be monitored.

At 1010, a change to a page may be detected. In various embodiments, a change to element(s) (e.g., structural elements, content elements, etc.) of a page may be detected. For example, the crawler may retrieve (e.g., continuously, at intervals, etc.) information representing the elements of a page in a placement group, and may compare the information to previously collected information representing the elements of a page. In some embodiments, a change to elements of the page may be detected based on the comparison. In certain cases, a change may only be detected if the change alters a portion of the page where native sponsored content is deployed. In some embodiments, a change may only be detected if the change would interfere with the display of native sponsored content on the page.

At 1020, it may be determined whether the native sponsored content template is compatible with the page (e.g., as changed). In various embodiments, the native sponsored content template may be compatible with the page if a native sponsored content item would be properly displayed on the page. A sponsored content item is properly displayed if the content item looks substantially similar to surrounding non-sponsored content on the page. In various embodiments, approaches used to identify pages (e.g., sections of website) compatible with a native sponsored content template (e.g., application of CSS selectors, page structure analysis, page content analysis, etc.) may be used to determine whether a modified page is compatible with the template. In the event that the sponsored content template is compatible with the modified page, the process may end. In the even the sponsored content template is not compatible with the modified page, the process may proceed to step 1030.

At 1030, use of the native sponsored content template may be suspended. In various embodiments, use of the sponsored content template may be suspended by preventing sponsored content from being displayed on the page. For example, native content (e.g., non-sponsored content) may be displayed in the location on the page where the template would display sponsored content prior to the change. Preventing sponsored content from being deployed to the page may prevent sponsored content from being displayed in an undesirable manner (e.g., as garbled text, out of alignment with other elements of the page, etc.). This may reduce the likelihood of advertisers having to pay for undesirable ad placements. Preventing sponsored content from being deployed to the changed page may increase the likelihood that the page as modified will load properly.

In various embodiments, a new native sponsored content template may automatically be generated based on information representing elements of the changed page. For example, native hierarchical content elements of the changed page may be mapped to sponsored content elements, and a template may be generated including the sponsored content elements. In some embodiments, an interface may be provided to allow a user to generate a new sponsored content template for the new page.

Figure 11:
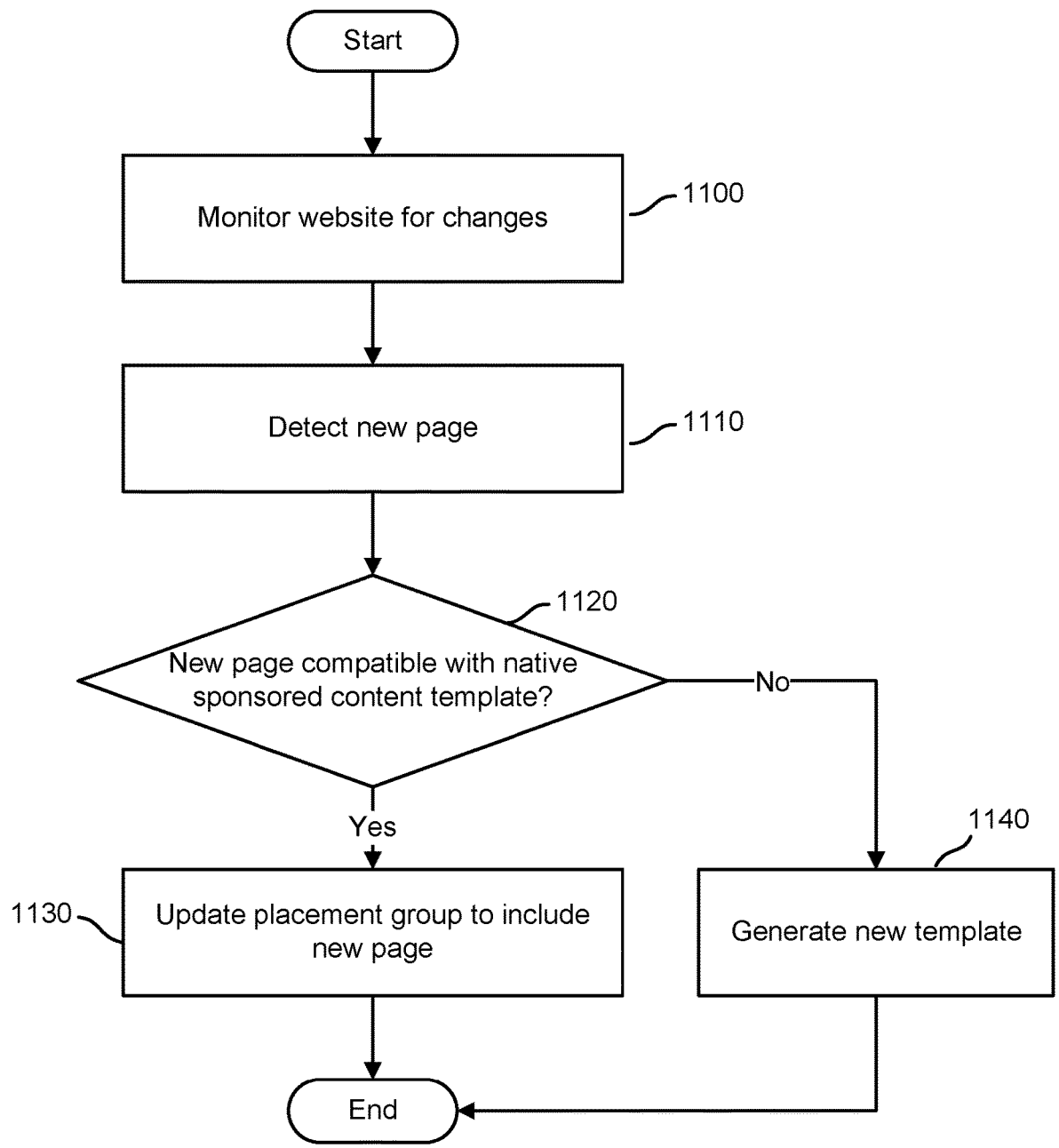
FIG. 11 is a flowchart illustrating an embodiment of a process to detect new pages added to a website.

FIG. 11 is a flow chart illustrating an embodiment of a process to detect new pages added to a website. At 1100, website(s) may be monitored for changes. In various embodiments, a website may be monitored to detect the addition of new pages. For example, a website may be monitored continuously, at intervals, and/or upon the occurrence of an event. In some embodiments, a website may be crawled to detect the addition of new pages.

At 1110, a new page may be detected. In various embodiments, a new page that was added to the website after generation of a native sponsored content template may be detected.

At 1120, it may be determined whether the new page is compatible with a native sponsored content template. In various embodiments, approaches used to identify pages (e.g., sections of website) compatible with a native sponsored content template (e.g., application of CSS selectors, page structure analysis, page content analysis, and/or other approaches discussed herein) may be used to determine whether a new page is compatible with a template. For example, page information representing elements of new page may be analyzed using the techniques disclosed herein to determine whether any of one or more native sponsored content templates associated with other pages in the site are compatible with the new page. In the event it is determined that the new page is compatible with a sponsored content template, the process may proceed to step 1130. In the event it is determined that the new page is not compatible with a sponsored content template, the process may proceed to step 1140.

At 1130, a placement group may be updated to include the new page. In various embodiments, the new page may be added (e.g., automatically added) to a placement group associated with the native sponsored content template that was determined to be compatible with the new page. As discussed above, a placement group may include pages and/or sections of a website in which a native advertisement will be placed (e.g., assigned to). In various embodiments, the native sponsored content template may be assigned to the new page once the new page is added to the placement group.

In various embodiments, the new page may be determined to be compatible with multiple native sponsored content templates, and the new page may be added to one or more of the placement groups associated with the compatible sponsored content templates.

According to some embodiments, upon a determination that the new page is compatible with a native sponsored content template, a prompt may be provided (e.g., output to a user) asking whether the new page be added to the placement group. An indication may be received (e.g., in response to the prompt) that the new page is to be added to the placement group, and the new page may be added to the placement group based on the received indication.

At 1140, a new template may be generated. In various embodiments, a new native sponsored content template may be automatically generated based on page information representing elements of the new page. For example, native hierarchical content elements of the new page may be mapped to sponsored content elements, and a template may be generated including the sponsored content elements. In some embodiments, an interface may provide to allow a user to generate a new sponsored content template for the new page.

Figure 12:
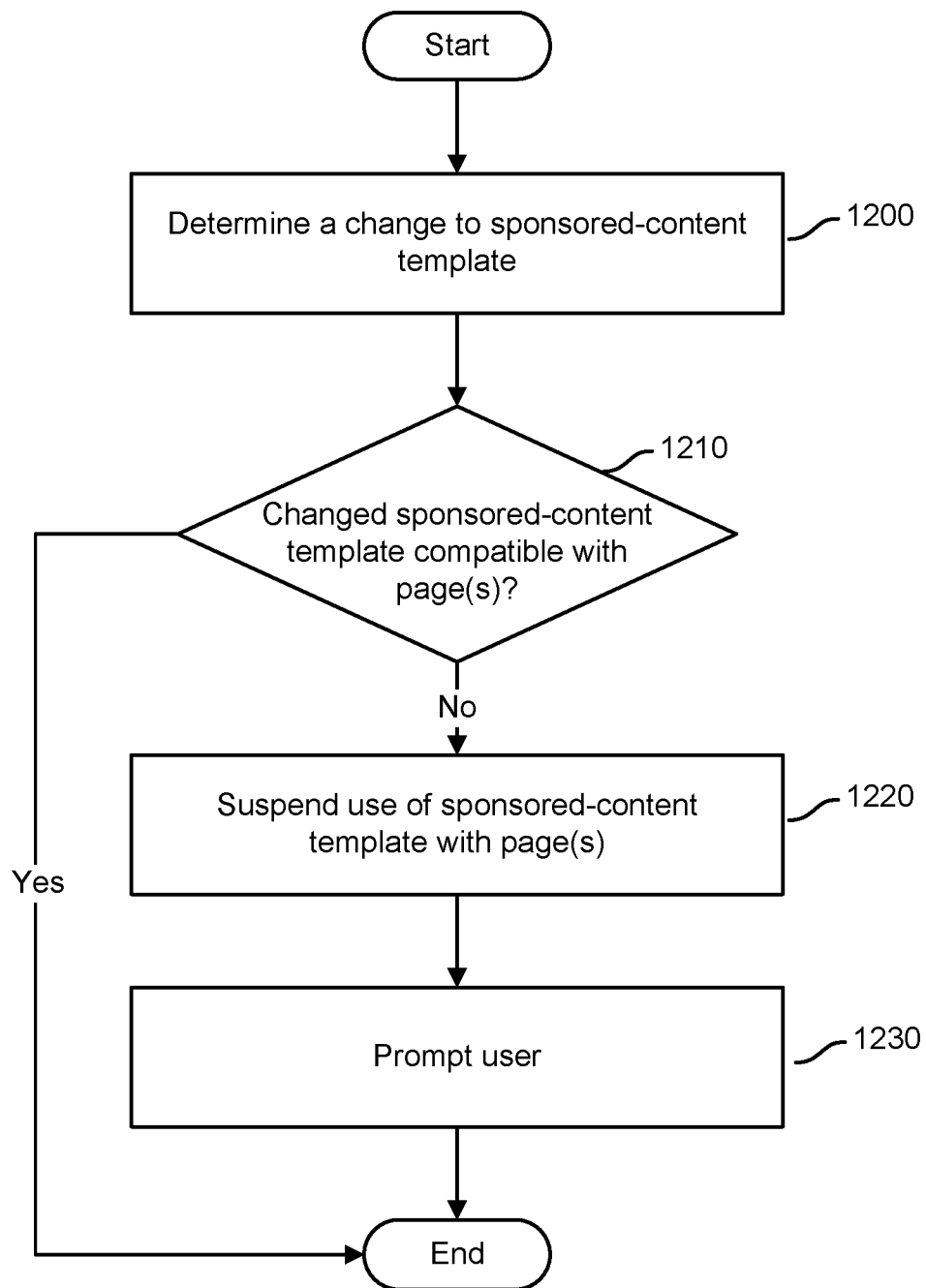
FIG. 12 is a flow chart illustrating an embodiment of a process to detect changes to a native sponsored content template.

FIG. 12 is a flow chart illustrating an embodiment of a process to detect changes to a native sponsored content template. At 1200, it may be determined that a native sponsored content template has changed. For example, a user (e.g., a publisher, advertising content provider, etc.) may have changed the native sponsored content template.

At 1210, it may be determined whether the changed (e.g., modified) native sponsored content template is compatible with one or more pages. In various embodiments, it may be determined whether the native sponsored content template is compatible with the pages in a placement group associated with the template. In the event it is determined that the changed native sponsored content template is not compatible with a page (e.g., in a placement group), the process may proceed to step 1220. In the event it is determined that the changed native sponsored content template is compatible with the pages in a placement group, the process may end and the template may be used with pages in the placement group.

At 1220, use of the native sponsored content template may be suspended. In various embodiments, use of the sponsored content template may be suspended by preventing sponsored content from being displayed on the page. In some embodiments, the changed template may be automatically updated to be compatible with the pages in the deployment group.

At 1230, a user may be prompted. In various embodiments, a user may be notified regarding the incompatibility of the template with the page(s). The user may modify the template, reassign the native sponsored content template to other compatible page(s), and/or take other actions. In certain cases, use of the sponsored content template may be suspended until the user takes action.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   crawling a plurality of pages associated with a website;
   generating corresponding page information for the plurality of pages;
   determining, based at least the page information, a plurality of potential locations that are compatible with a content template for one of the plurality of pages, wherein the content template is configured to be used to generate a content item, wherein the content template is configured to define one or more attributes associated with the content item; and
   embedding the content template in at least one selected location of the plurality of potential locations that are compatible with the content template for the one of the plurality of pages, wherein the content item is displayed at the at least one selected location of the plurality of potential locations upon a page corresponding to the at least one selected location of the plurality of potential locations being loaded.

2. The method of claim 1, further comprising providing a plurality of renderings of the content template at the plurality of potential locations that are compatible with the content template.

3. The method of claim 2, further comprising receiving a selection of the at least one of the plurality of potential locations that are compatible with the content template.

4. The method of claim 3, further comprising updating a placement group associated with the content template.

5. The method of claim 4, wherein the placement group includes one or more locations at which the content template is to be placed.

6. The method of claim 1, wherein the plurality of potential locations are determined to be compatible with the content template based in part on a corresponding structural layout.

7. The method of claim 1, further comprising generating a selector based on portions of a page.

8. The method of claim 7, wherein the selector is compared to the page information for the plurality of pages.

9. The method of claim 7, wherein the selector is a cascading style sheets selector.

10. The method of claim 7, wherein the selector is configured to identify elements of a page that are compatible with the content template.

11. The method of claim 1, wherein the plurality of potential locations that are compatible with the content template are determined to be compatible with the content template based on a similarity score.

12. The method of claim 11, wherein the similarity score is based on a cosine similarity.

13. The method of claim 1, wherein the plurality of potential locations are determined to be compatible with the content template based on corresponding structural vectors.

14. The method of claim 13, wherein the corresponding structural vectors are based on a term frequency-inverse document frequency value.

15. The method of claim 1, further comprising monitoring the plurality of pages for one or more changes.

16. The method of claim 15, further comprising detecting a change to at least a first page of the plurality of pages.

17. The method of claim 16, further comprising determining that the content template is compatible with the detected change.

18. The method of claim 16, further comprising determining that the content template is not compatible with the detected change.

19. A system, comprising:
   a processor configured to:
      crawl a plurality of pages associated with a web site;
      generate corresponding page information for the plurality of pages;

determine, based at least the page information for the plurality of pages, a plurality of potential locations that are compatible with a content template for one of the plurality of pages, wherein the content template is configured to be used to generate a content item, wherein the content template is configured to define one or more attributes associated with the content item; and embed the content template in at least one selected location of the plurality of potential locations that are compatible with the content template for the one of the plurality of pages, wherein the content item is displayed at the at least one selected location of the plurality of potential locations upon a page corresponding to the at least one selected location of the plurality of potential locations being loaded; and a memory coupled to the processor and configured to provide the processor with instructions.

20. A computer program product, the computer program product being embodied on a non-transitory computer readable storage medium and comprising instructions for:

crawling a plurality of pages associated with a web site;

generating corresponding page information for the plurality of pages;

determining, based at least the page information for the plurality of pages, a plurality of potential locations that are compatible with a content template for one of the plurality of pages, wherein the content template is configured to be used to generate a content item, wherein the content template is configured to define one or more attributes associated with the content item; and embedding the content template in at least one selected location of the plurality of potential locations that are compatible with the content template for one of the plurality of pages, wherein the content item is displayed at the at least one selected location of the plurality of potential locations upon a page corresponding to the at least one selected location of the plurality of potential locations being loaded.

* * * * *